July 31, 1928.

H. W. SLINING

PLUMBING FIXTURE

Filed Oct. 27, 1926

1,679,276

INVENTOR
HENRY W. SLINING
BY Munn & Co.
ATTORNEY

Patented July 31, 1928.

1,679,276

UNITED STATES PATENT OFFICE.

HENRY W. SLINING, OF LOS ANGELES, CALIFORNIA, ASSIGNOR TO REPUBLIC BRASS & MFG. CO., OF LOS ANGELES, CALIFORNIA, A CORPORATION OF CALIFORNIA.

PLUMBING FIXTURE.

Application filed October 27, 1926. Serial No. 144,524.

This invention relates to plumbing fixtures and has for its primary object the provision of a mixing chamber having hot and cold water connections and means for mounting said connections so that they may be quickly and properly aligned with and joined to mating hot and cold water pipes in a way that will permit the fixture to adapt itself to pre-existing conditions. The invention is particularly useful in connection with sink fixtures which frequently employ a vertical wall through which holes are bored for the reception of the hot and cold water pipes respectively. These pipes are intended for association with a faucet structure whose hot and cold water connections are usually fixedly spaced apart, so as to align whenever possible with the corresponding pipes of the sink fixture. It frequently happens that in boring the aforementioned holes, due to miscalculating the distance therebetween, or for some other reasons, it is impossible to apply the faucet structure to the hot and cold water pipes without resorting to changes of some description or another, resulting in added expense at an expenditure of time and labor. Due to these conditions it is impossible to install fixtures of this character in true workmanlike manner, so that the applied fixture will be neat and attractive in every respect.

My invention is so designed that the respective water connections of the structure are each capable of movement, so that a wide range of adjustment thereof can be made in any direction radial of the axis of the mating water pipe.

With the foregoing and other objects in view, the invention consists in the novel construction, combination and arrangement of parts constituting the invention to be hereinafter specifically described and illustrated in the accompanying drawings which form a part hereof, wherein is shown the preferred embodiment of the invention, but it is to be understood that changes, variations and modifications can be resorted to which come within the scope of the matter hereinafter claimed.

Figure 1:
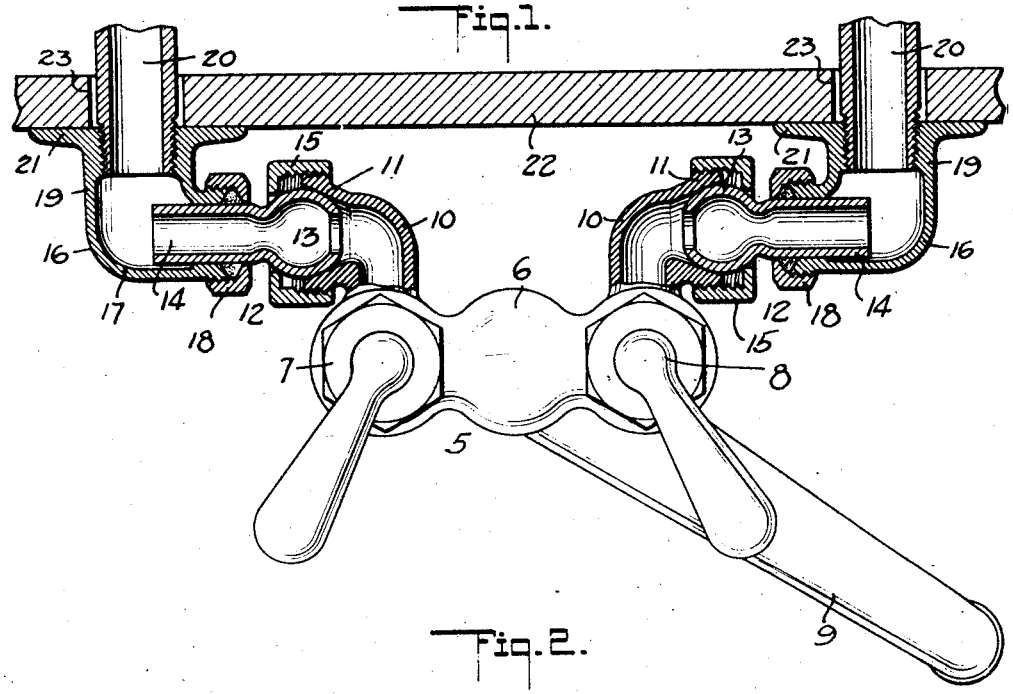
Figure 2:
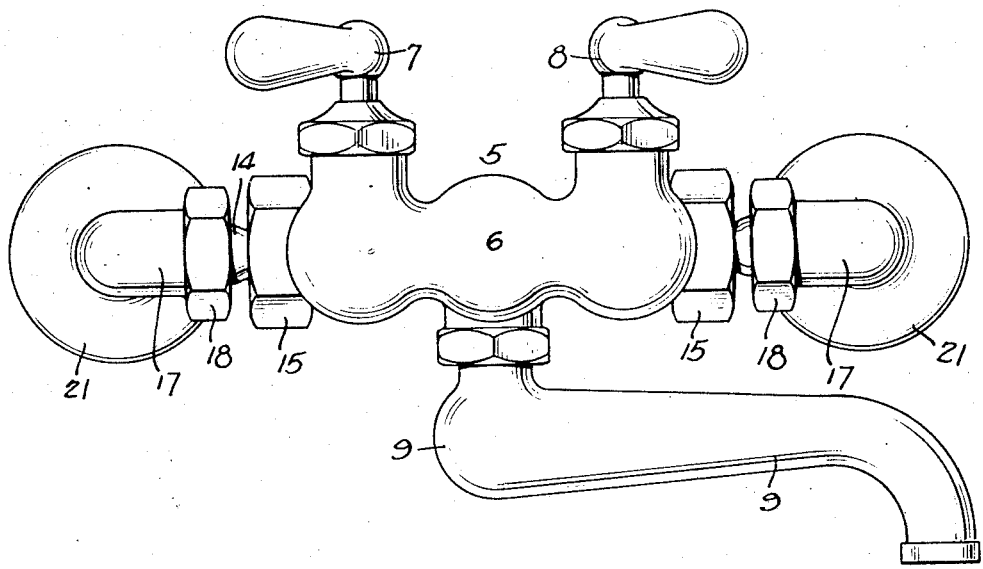

In the drawings in which similar reference numerals indicate like parts in the different figures, Figure 1 is a view in plan of my improved fixture with parts in section; and Figure 2 is a view in front elevation thereof.

In carrying the invention into practice, use is made of a faucet structure 5, consisting of a body formed with a mixing chamber 6. This chamber is provided at its respective sides with valves 7 and 8, which may be of any suitable, well-known construction capable of permitting the flow of graduated quantities of water to the mixing chamber. A nozzle 9 joins the chamber 6 in order to permit of the discharge of water from the fixture.

The respective ends of the mixture chamber are of identical construction and it is believed that a description of one will satisfactorily suffice for the other, it being understood that hot water is permitted to flow into one end and cold water in to the other.

Each of the aforementioned ends of the fixture 5 in respective proximity to its valve is formed preferably with an integral elbow 10, having a flared terminal seat 11, which constitutes the female element of a universal joint 12. The male element of the joint consists of a ball 13 formed on one end of a pipe 14. The ball is held in operative relation to the faucet by means of a coupling sleeve 15 threadedly connected with the elbow 10.

A second elbow 16 is provided, and as shown, its branch 17 is slidably mounted on the pipe 14, and it is associated therewith through a gland 18 so that the joint between the pipe and said branch 17 is sealed and made water tight. The other branch 19 of the elbow 16 is internally threaded to accommodate itself to the water supply pipe 20. The said other branch or lead 19 of the elbow 16 is formed with a wall flange 21, adapted to come flatwise against the vertical wall 22. The vertical wall is of the customary type employed in conjunction with wall fixtures of the type herein described generally, and same is provided with the usual openings 23 for the accommodation of the supply pipes 20.

From the description herein set forth, it follows that without regard to the relative distance of the openings 23, the mating hot and cold water elbows 16 can be respectively turned with the universal joints as pivotal points, and slid radially in any direction from these pivotal points, so that true alignment between the fixture and the pipes 20 can be had quickly and with accuracy, and with assurance that there will be no friction between the characterizing instrumentalities comprising my invention.

I claim:

A fixture formed with a mixing chamber and provided with integral elbows having flared terminal seats opening, respectively, in opposite directions, each elbow formed with an external thread outwardly of its flared seat, coupling sleeves adjustable on the threads of said elbows, pipe sections extending through the sleeves and having apertured ball portions mounted in the respective sockets and adapted to be brought into water-tight frictional contact with the walls of the sockets when the coupling sleeves are adjusted in one direction, the pipe sections adapted to be tilted with respect to said elbows, and elbows mounted for longitudinal sliding movement on said pipe sections and having packing glands in co-action with the pipes to render the joints therebetween watertight.

HENRY W. SLINING.